June 8, 1926.
H. A. WHITESIDE
ELECTRIC MOTOR
Original Filed Feb. 11, 1919
1,587,738
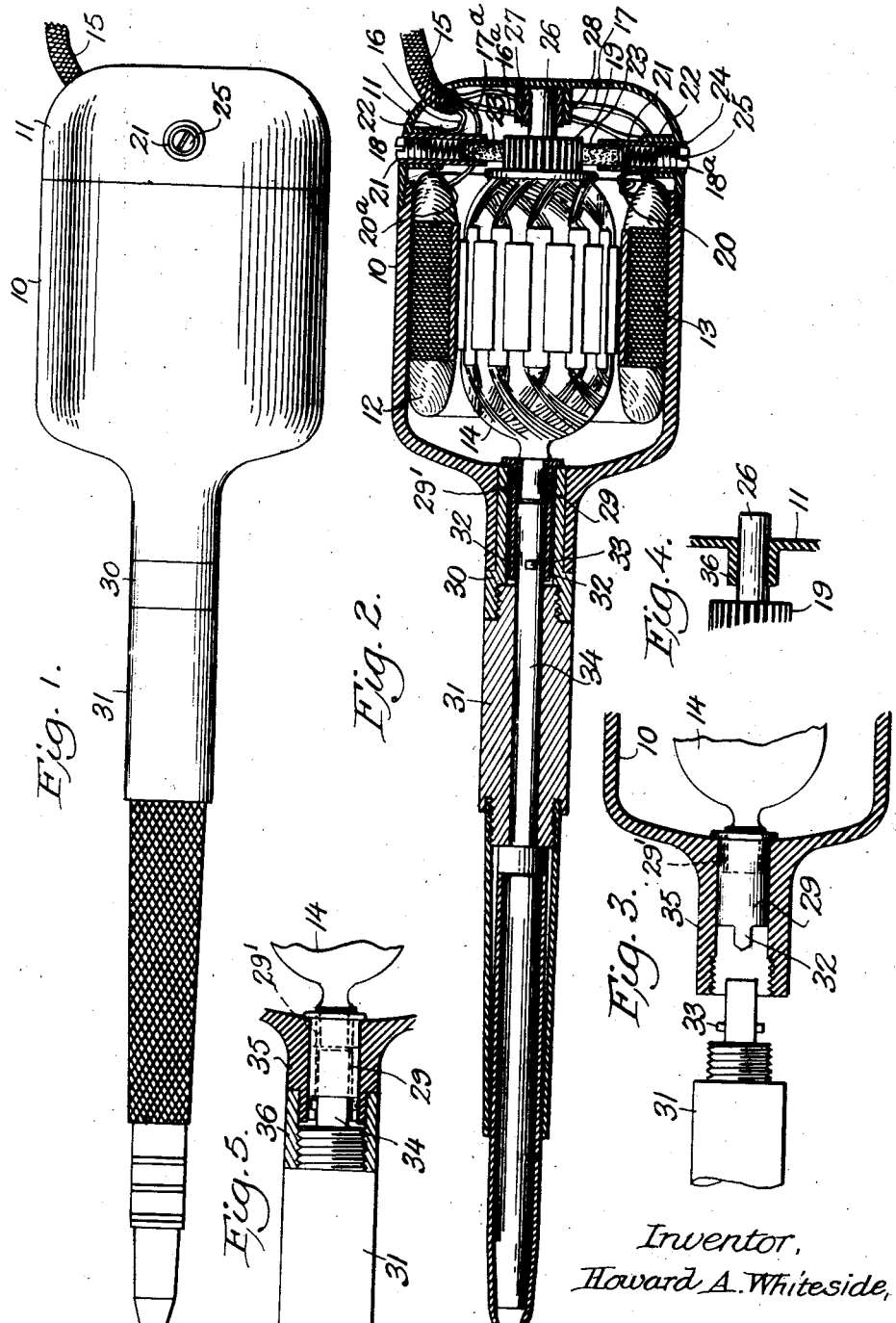
Inventor,
Howard A. Whiteside,
by G. A. O. Rosell,
Attorney.

Patented June 8, 1926.

1,587,738

UNITED STATES PATENT OFFICE.

HOWARD A. WHITESIDE, OF NEW YORK, N. Y.

ELECTRIC MOTOR.

Application filed February 11, 1919, Serial No. 276,449. Renewed August 19, 1925.

This invention relates to electric motors and especially portable motors connected to drive a tool, the motor being inclosed in insulating material. The invention is more fully described in the following specification, set forth in the appended claims and illustrated in the accompanying drawings, in which:

Fig. 1 is a side view of the device,

Fig. 2 is a longitudinal sectional view of the same,

Fig. 3 is a modified sectional view of one of the bearings,

Fig. 4 is a sectional view of the opposite bearing,

Fig. 5 is another modified form of bearing.

The construction of motors of small size offers great difficulties. In assembling the minute parts the greatest care must be taken that there be no crossing of circuits by these parts; and when these motors are inclosed in a hollow handle, means must be provided to prevent short circuiting by the hand of the operator.

The device shown in the drawings is provided with a handle comprising a shell 10 of non-conductive or insulating material, such as bakelite, or the like, having a cap 11 with threads on its inner edge, so it may be screwed on the shell 10. Within the latter is an electric motor with field coils 12 and laminated magnet 13 around its interior and centrally located is the armature 14. The motor is, as shown, entirely insulated from any agency which might cross-circuit the electric current which is introduced by means of a cord 15 carrying the wire 16 terminating at one brush 18 and wire 17 at the other brush 18ª, wire 16ª terminating at one field coil terminal 20 and wire 17ª at the other field coil terminal 20ª.

Each brush 18 consists of a metal bushing 21 set into the cap 11 and held by the sleeve 22 integral with the said cap and also of non-conducting material. Freely moving in the open end of the bushing is a carbon brush 23 adapted to bear upon the commutator 19 and pressed inward against the same by a spiral spring 24. After the brush and spring are inserted in the bushing they are confined therein and the pressure of the spring is increased or relaxed by means of a screw 25.

The spindle 26 of the armature is mounted in a bushing 27 of hard metal at the centre of the cap 11, the bushing being secured in the thimble 28 of the cap, while the other end of the armature spindle is provided with a sleeve 29 playing in the hard metal bearing 30 which carries the stem or hand piece 31 of the tool, being connected by appropriate screw threads. In order to thoroughly insulate the armature from sleeve 29 an insulating bushing 29' is disposed between the armature spindle and said bushing. The outer end of sleeve 29 has prongs 32 to engage the pin 33 of the tool spindle 34 and provide a loose but positive connection, easily disconnected when the stem 31 is removed.

In the form of bearing shown in Fig. 3 the bushing 30 is dispensed with as the sleeve 29 provides abundant surface for the necessary support, and if the shell and its stem 35 are of insulating or non-conductive material, the length of the sleeve will be sufficient with proper lubrication to afford a reliable bearing surface. The rear end spindle, as shown in Fig. 4, may also be journalled directly in the sleeve 36 of the cap 11 without the interposition of a hard metal sleeve.

In the construction shown in Fig. 5 the sleeve 29 has its bearing directly in the stem 35 of the shell 10 but in order to secure the stem of the tool thereto, a sleeve 36 of steel or hard metal is secured to the stem 35 and has screw threads in its interior to which the stem 31 may be screwed.

The screw joints at various parts of the device afford a ready means for gaining access to the interior of the shell and the parts are so grouped that they may be easily removed and separated for repair or renewal.

It is obvious that the parts may be otherwise arranged or modified without departing from the essential features above described or from the scope of the appended claims.

What I claim is—

1. A hand carried dental or surgical instrument including, in combination, a hand strument including a holder for an operating piece including a holder for an operating tool or implement, a motor including a casing constructed entirely of insulating material forming an enclosure completely housing the motor and having a forwardly projecting reduced part of insulating material for connecting the motor and hand piece to form a unitary instrument suitable for carrying in the hand during performance of a surgical operation, said casing including a cap of insulating material removably secured to the casing, brushes carried by said cap for conducting current to the motor armature, said motor having a rotor, field core and field coils mounted in said insulating casing, bearings carried by said reduced casing part and said insulating cap for supporting said rotor in concentric position with reference to said field core and field coils and a driving coupling for said rotor for transmitting power to the operating implement, said coupling being insulated to protect the hand piece and implement from electrical connection with the rotor.

2. A hand carried dental or surgical instrument including, in combination, a hand piece including a holder for an operating tool or implement, a motor including a casing constructed entirely of insulating material forming an enclosure completely housing the motor and having a forwardly projecting reduced part of insulating material forming a supporting stem, a stationary bearing sleeve securely seated in said supporting stem and being threaded to the hand piece for connecting the motor and hand piece to form a unitary instrument suitable for carrying in the hand during the performance of a surgical operation, said casing including a cap of insulating material removably secured thereto, said motor having a rotor, field core and field coils mounted in said insulating casing, a bearing in said insulating cap for supporting one end of the rotor, a rotary bearing sleeve rotatably supported in said stationary bearing sleeve having a driving connection with said implement and a supporting connection with the other end of the rotor, said supporting connection being insulated to prevent shocking the patient or the operator by electrical connection with the rotor.

3. A hand carried dental or surgical instrument including, in combination, a hand piece including a holder for an operating tool or implement, a motor including a casing constructed entirely of insulating material forming an enclosure completely housing the motor and having projecting integral reduced part of insulating material forming a supporting stem for connecting the motor and hand piece to form a unitary instrument suitable for carrying in the hand during performance of a surgical operation, said casing including a cap of insulating material removably secured to the casing, said motor having a rotor, field core and field coils mounted in said insulating casing, and said field core being mounted within said casing and directly supported thereby, a bearing carried by said removable cap for supporting one end of said rotor, a bearing member rotatably supported in said stem and insulated from said rotor, and means for connecting said bearing member with said operating implement.

4. A hand carried dental or surgical instrument including, in combination, a hand piece including a holder for an operating tool or implement, a motor casing constructed entirely of insulating material and being attached at one end to said hand piece to form therewith a unitary instrument suitable for carrying in the hand during the performance of a surgical operation, a removable cap for said casing constructed of insulating material, a motor supported in said insulating casing and having a field core supported directly by the casing and insertable therein and removable therefrom when the cap is removed, an armature concentric with said field core, bearings on said casing and cap for supporting said armature and insulated against electrical connection of the motor with the operating implement or hand piece, and a coupling for coupling the armature to the operating implement and being insulated to prevent electrical connection of the armature with the operating implement or hand piece.

5. In a motor in combination, an insulating casing having an integral bushing, a tool holder, means engaging said bushing for rigidly supporting said holder on said casing, a rotor supported in said casing and adapted to be connected to said tool holder, and means for insulating said tool holder from said rotor.

6. In a motor in combination, an insulating casing having an integral bushing, a tool holder, means engaging said bushing for rigidly supporting said holder on said casing, a rotor supported in bearings integrally formed in said casing and adapted to be connected to said tool holder, and means for insulating said tool holder from said rotor.

7. In an electric motor, a field structure, an armature, a shaft therefor, a rigid self-supporting unitary insulating casing, forming a structural part of the motor and constituting the sole support for the field structure, a tubular metallic bushing into which one end of the armature shaft extends, supported by one end of the said insulating casing, and means carried by the bushing for attachment of the stationary part of a tool driven from the adjacent end of the armature shaft.

8. In an electric motor, a field structure, an armature, a shaft therefor, a rigid self-supporting unitary insulating casing, forming a structural part of the motor and constituting the sole support for the field structure, the insulating casing being open at one end and substantially closed at the other end, a tubular metallic bushing, into which one end of the armature shaft extends, centrally supported in and by the closed end of the casing, the bushing being threaded for attachment thereto of the stationary part of a tool driven from the armature shaft.

Signed at New York, in the county of New York and State of N. Y., this 6th day of February, A. D. 1919.

HOWARD A. WHITESIDE.